Jan. 20, 1942.  E. H. FABRICE  2,270,424
RECEPTACLE SEALING CAP
Filed Feb. 19, 1940  2 Sheets-Sheet 1
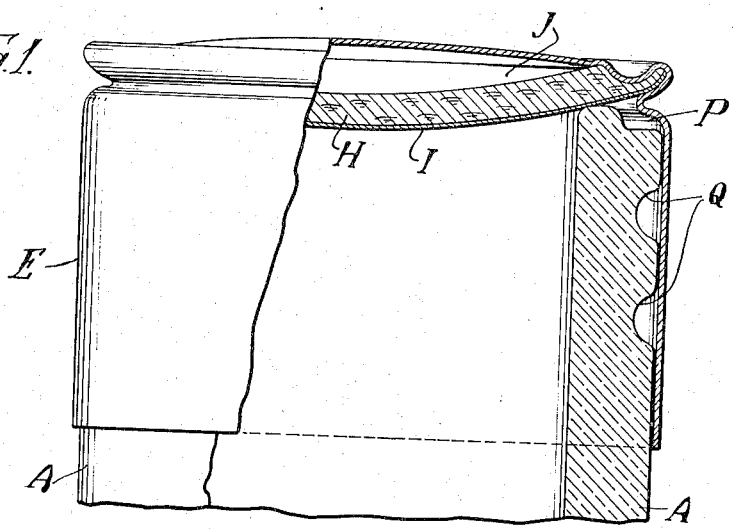
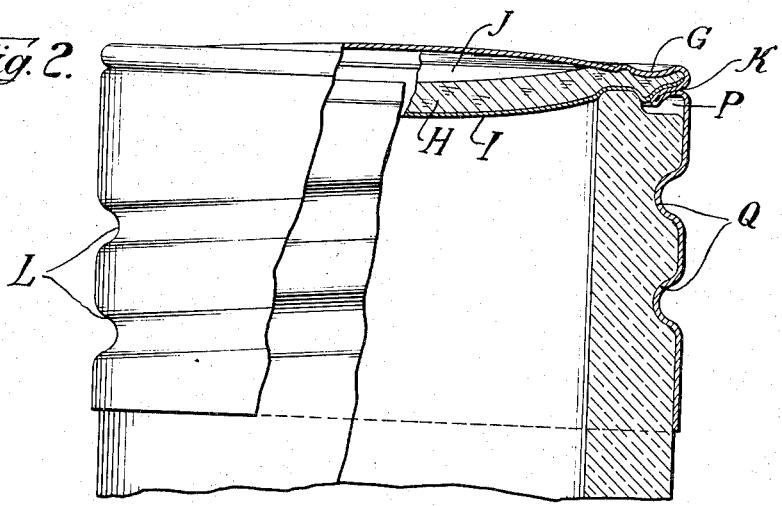
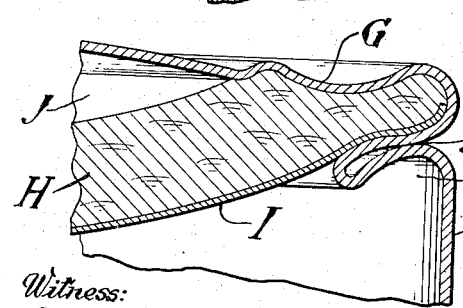
Witness:
E. Camporini
Inventor
Edward H. Fabrice,
By: Rudolph M. Lotz
Attorney Jan. 20, 1942.  E. H. FABRICE  2,270,424
RECEPTACLE SEALING CAP
Filed Feb. 19, 1940  2 Sheets-Sheet 2
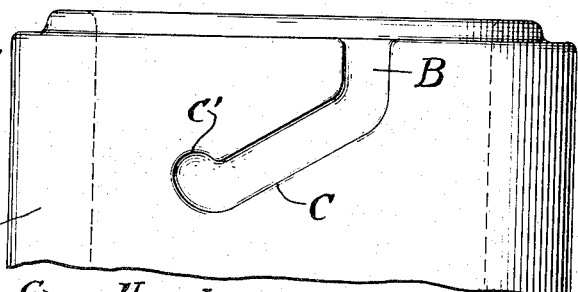
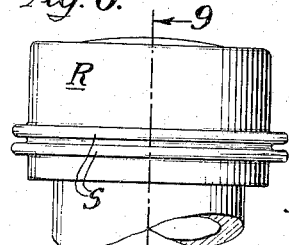
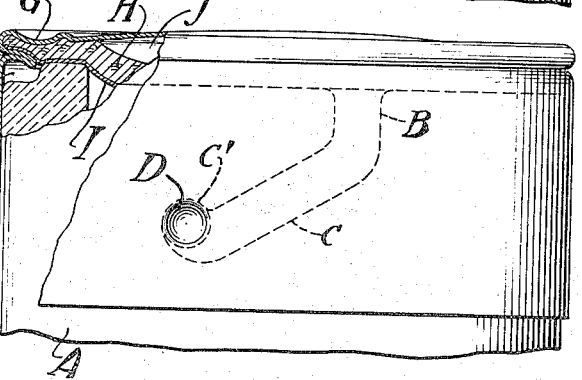
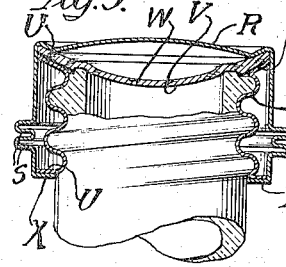
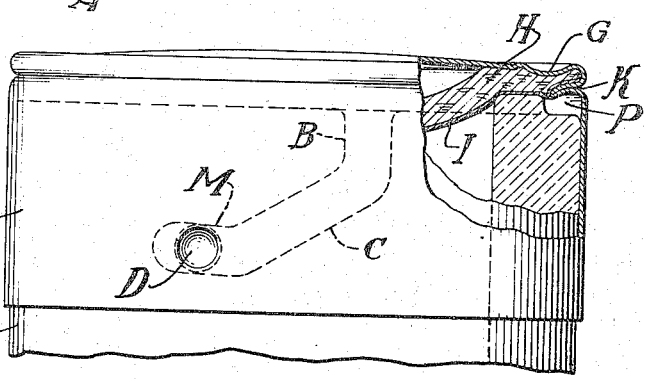
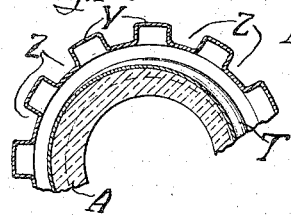
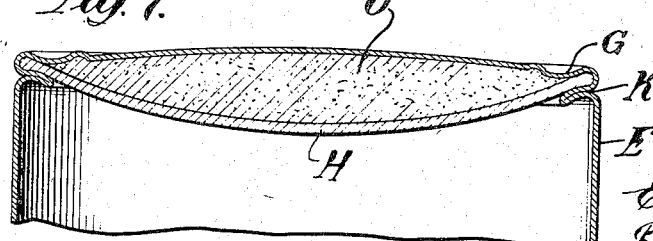
Inventor:
Edward H. Fabrice,
By:
Rudolph
Attorney.
Witness:
E Camporini Patented Jan. 20, 1942

2,270,424

UNITED STATES PATENT OFFICE 2,270,424

RECEPTACLE SEALING CAP

Edward H. Fabrice, Chicago, Ill.

Application February 19, 1940, Serial No. 319,649

1 Claim. (Cl. 215—43)

The present invention has for its object to provide a receptacle sealing cap which is adapted for all purposes for which sheet metal sealing caps are used and which is particularly well adapted for sealing receptacles containing products of a sticky or adhesive nature, such as syrups, medicines, and other products possessing a relatively high percentage of syrup or other content of an adhesive substance; and which possesses other advantages as hereinafter particularly pointed out.

One of the most important objects of the invention is to provide a receptacle sealing cap which also constitutes a safety valve for the receptacle to effect release of fluid pressures incident to its contents or resulting from fermentation of the latter or undue heating thereof when the pressure within the receptacle attains a degree less than that at which the receptacle is apt to burst.

Therefore, a very important object of the invention is to provide a longitudinally expansible sealing cap for receptacles, especially of the type wherein the cap and receptacle are equipped with inter-engaging formations, such as threads, bayonet joints and the like, intended to permit the cap to be forced into sealing position, whereby to cause said formations of the cap to be maintained under tension when the cap is in its receptacle sealing position to a degree which will maintain it frictionally in said position against the loosening action incident to changes of temperature, vibration, etc., etc.

A further important object of the invention is to provide a receptacle sealing cap equipped in its crown portion with a cushion which will absorb the dynamic force of the projection of liquid contents of the receptacle against the crown of the cap.

A further object of the invention is to provide a receptacle and sealing cap for same equipped with bayonet joint connections so formed that the cap may be substantially locked against accidental loosening in transit and handling prior to delivery to the ultimate consumer, without affecting the fluid-tight joint between the cap and receptacle.

Suitable embodiments of the invention are illustrated in the accompanying drawings, wherein:

Fig. 1 is a central vertical, longitudinal, sectional view, partly in elevation, showing a receptacle sealing cap and the neck portion of a receptacle constructed in accordance with the invention and showing the cap in its initial form.

Fig. 2 is a view similar to Fig. 1 showing the cap in its final shape and equipped with thread formations.

Fig. 3 is a fragmentary, detail, enlarged sectional view, showing an upper corner portion of the cap.

Fig. 4 is a view in side elevation of the neck portion of a receptacle equipped with a bayonet joint groove constructed in accordance with the invention.

Fig. 5 is a side elevation showing the neck portion of the receptacle and the cap for same partly in section and the balance of the cap and neck portion of the receptacle in elevation.

Fig. 6 is a view similar to Fig. 5 showing a modified form of bayonet joint groove in the receptacle neck portion.

Fig. 7 is a fragmentary, sectional, longitudinal view of the cap showing a modified form of construction.

Fig. 8 is a view in side elevation of the cap, showing a modified form of construction.

Fig. 9 is a view in central longitudinal section taken on the line 9—9 of Fig. 8.

Fig. 10 is a plan sectional view of a modified form of construction of the cap.

As shown in Fig. 4, the receptacle A is equipped with a bayonet joint groove B having a vertical upper end portion or arm portion and a lower inclined arm portion C, the upper wall of which is equipped with a shallow recess $C^1$ to receive the projection D in the skirt portion of the sealing cap E when the latter is rotated clockwise to the limit of its movement determined by the left-hand end of the arm portion C of said groove B.

The cap E, composed of a resilient sheet metal, is equipped circumferentially of its crown F with an annular fold G in which the circumferential edge portions of a disk H of cork, or other suitable resilient material, and the circumferential edge portion of a lining disk I of marcasite, paraffin-coated paper, or the like, are compressed to hold them against rotation and removal. The compression of said edge portions of said disks effects displacement of the materials of which they are composed, inwardly from said edge portions and thus they present central dished formations which are convex along their lower faces and between which and the crown F of the cap a hollow space J is formed.

Immediately below the fold G of the cap, the annular recess K is provided, of which the lower wall of the fold G constitutes the upper wall. Said recess K is initially formed with a relatively wide mouth and is subsequently contracted longitudinally of the cap and becomes a bellows formation which is expansible and is sufficiently resilient to be self-restoring to its contracted state.

The number of bayonet joint grooves, B, C, D will be sufficient to balance sealing pressure annularly of the rim of the receptacle mouth. The skirt portion of the cap is provided with inwardly projecting formations L equal in number with and spaced apart in harmony with that of said grooves for cooperation with the latter to effect sealing of the receptacle.

When the said projections D attain the position in the arms C of the grooves B immediately to the left, or clockwise of the recesses C¹, the annular recess K of the cap will be expanded appreciably and will contract slightly as said projections D enter the recesses C¹ of the grooves. Thus the sealing pressure exerted by the rim of the crown of the cap E immediately inwardly of the fold G of said cap is of a yielding nature and the formations D of the cap are maintained by tension in the recesses C¹ from which they are removed by the forced anti-clockwise rotation of the cap in an obvious manner when the cap is to be removed.

The arm portion C of the groove (Fig. 6) may terminate in a portion inclined slightly upwardly clockwise of the arm portion C, said portion being adapted to preserve the function of the recess C¹, as illustrated in Fig. 4.

The bellying of the disks H and I is advantageous in that the disk I attains a relatively light pressure sealing position before the cap attains its ultimate sealing position on the receptacle. When the cap reaches the last-named sealing position, a slight displacement of air in the crown of the cap toward the middle of the hollow space occurs, which serves to still further belly said disks H and I for maintaining the air trapped in the crown of the cap under a slight pressure.

In the case of vacuum packing of receptacles, the cap of this invention is very advantageous, in that it can be disposed in the initial sealing position aforesaid during the period wherein the packed receptacle is subjected to vacuum. The vacuum will obviously affect the air trapped in the crown of the cap to cause it to further belly the disks H and I and thus improve the sealing effect thereof and hold the vacuum in the receptacle to an appreciable degree prior to moving the cap to its ultimate sealing position.

If the content of the receptacle is of a sugary, syrupy or other adhesive nature, the rim of the mouth of the receptacle will carry a thin film of the content after a portion of the same is poured out and this usually causes the lining disk I of the cap to adhere to the said rim when next the removal of the cap is attempted, thereby withdrawing the liner disk from the cap and requiring its disengagement from said rim and replacement in the cap. In many instances the disengagement of said disk from said rim causes said disk to be torn marginally and prevents resealing of the receptacle. By anchoring said lining disks against movement relatively to the caps they are caused to become disengaged from said rim without injury and in the instant structure the air cushion back of the disks H and I renders the latter better adapted to become disengaged from the said lining than is otherwise true.

Naturally the air pocket may be replaced by a filler cushion of a resilient material, such as latex, as shown at O in Fig. 7 without affecting the advantages incident to the cushioning effect aforesaid.

While the inward projection of the bellows formation G is very small in proportion to the diameter of the cap and will usually occupy only the space afforded by the outer radiused edge of the rim of the mouth of the ordinary bottle, or other receptacle, it is preferable to shape said rim to provide the annular recess P about said rim, as shown in Fig. 1.

In place of the bayonet joint connection between the cap and bottle, as above described, the receptacle and cap may be equipped with interengaged thread formations L and Q, as shown in Figs. 1 and 2, it being obvious that any type of interengaging formations on the cap and receptacle for securing the cap removably to the receptacle and providing means for forcing the cap into sealing position and retaining it there, can be used.

So long as the cap is not disposed in such position upon the receptacle that the packing elements thereof are firmly compressed between the rim of the receptacle mouth and the opposed portion of the crown of the cap, air contained in the cap and receptacle will escape from the receptacle responsively to an appreciable degree of vacuum externally of the receptacle as the resulting fluid pressure within the receptacle will suffice to cause the said packing elements to yield sufficiently to permit escape of air from past the said rim, but as soon as the fluid pressures within and around the receptacle are substantially balanced, the said packing elements will restore themselves to sealing position by their own resiliency and then when the receptacle is removed from the vacuum chamber, an expansion of the packing elements results because of atmospheric pressure between it and the cap and this expansion causes the sealing elements to hug the rim of the mouth more closely to increase appreciably the sealing pressure on the rim of the mouth of the receptacle.

As the contents of vacuum packed receptacles are usually of a more or less liquid nature and are at substantially the boiling point of water at the moment that the receptacle is introduced into a vacuum chamber, and thus emits steam during the whole of the sealing operation, the last-mentioned sealing effect of the packing elements suffices to prevent flow of air into the receptacle during the extremely short interval following removal of the receptacle from the vacuum chamber and the completion of the sealing operation.

By reference to Fig. 1 it will be noted that the fold G is disposed at an upward and outward incline relatively to the axis of the cap, so that in instances where the packing disk employed is of a hard material which will not be reduced appreciably in thickness by the pressure of the walls of the fold G, said disk will still be bellied to some degree because of said angular relation of the fold G.

A distinctive and very important advantage of the invention lies in the fact that the cap may be disposed to exert a sufficient pressure on the sealing elements to maintain a hermetic seal against admission of air to the receptacle and to resist leakage from the same up to a given maximum pressure which is appreciably less than that at which receptacles will burst, thus allowing for an increase in internal pressure such as might result from fermentation within the receptacle or undue heating of the same and its contents to a point still below the said bursting pressure, at which the cap will elongate sufficiently to permit escape of gases therefrom, the cap thus constituting a safety valve as well as a sealing device.

In instances where the cap is disposed upon receptacles, such as bottles, containing liquids, such as liquors, in the handling of which in transit and loading and unloading cases containing the filled receptacles, the contents of the latter may be projected with force against the sealing elements (said force being sufficient sometimes to effect fractures), the said force is cushioned sufficiently by the yielding of the middle portion of the sealing elements to prevent fracture of the receptacle. Obviously the bellows fold in the cap affords a further safeguard against such fracture.

It will be obvious that in order to spring the formation D of the cap into the terminal formation $C^1$ or M of the bayonet-point groove of the receptacle, the bellows K of the cap must be partially expanded as said formation D reaches the lower end of the groove C and will contract at least partially to its normal state as said formation D enters the terminal formation D or M. In reversing the rotation of the cap the bellows formation K of the latter will be expanded as said reverse rotation is initiated and will contract as soon as said formation D has moved slightly along the portion C of the bayonet joint groove.

The structure illustrated in Fig. 8 and Fig. 9 comprises an outer cap R which is equipped between its ends with several outwardly projecting bellows formations S. Within said cap there is mounted a threaded sleeve T equipped at its ends with outwardly projecting annular flanges U. The upper flange U bears upon the marginal edge portion of the liner disk V, which covers the disk W of material such as cork, and holds said disks firmly in place. The cap R is equipped at its lower end with an inwardly projecting annular flange X which bears firmly against the lower flange U of the sleeve T.

Obviously the cap R is yieldingly elongatable responsively to pressure of the rim of the receptacle neck if the sleeve is forced beyond the normal position requisite to firmly sealing the receptacle and also responsively to pressure within the latter to afford the safety valve function hereinbefore described.

In instances where the sealing pressure exerted by the cap on the bottle is to be limited to cause elongation of the cap under a predetermined pressure developed within the receptacle, the bayonet joint connection between the cap and receptacle is preferable to the threaded association, because the latter enables the cap to be be drawn down to effect a seal so tight and a corresponding elongation of the cap such as might easily defeat unsealing of the receptacle responsively to internal pressure less than that which would burst the receptacle.

Obviously, the annular fold in the cap which clamps the packing disk H in place will also yield to the internal pressure in the receptacle to increase the degree of elongation of the cap in cooperation with the bellows fold K or the bellows folds S of Figs. 8 and 9.

It is also obvious that any one or all of the bellows folds or formations of the cap may be discontinuous to render them sufficiently resilient to yield responsively to a relatively low pressure developed within the receptacle, if desired. Thus in Fig. 9, the bellows folds Y are equipped with recesses Z which may be of any desired number and arcuate length, but are preferably equally spaced from each other, the portions of said folds between the recesses Z being thus rendered very elastic.

I claim as my invention:

A sealed receptacle comprising in combination, a receptacle equipped with a mouth equipped with an annular upwardly projecting bead spaced from the outer edge of the said mouth and equipped with an upper edge convex in cross section and a closure cap of resilient sheet metal mounted upon said neck portion and including a skirt portion and a crown portion, the latter and the upper end of the skirt portion equipped with an annular inwardly projecting folded expansible flange disposed over and spaced from the portion of the rim of the said mouth surrounding said bead, a resilient concavo-convex gasket having its convex face opposed to said bead and its middle portion projecting into the said mouth and its marginal edge portion clamped between the marginal edge portion of the crown and said folded flange, said skirt portion and neck equipped with interengaged formations for detachably joining the same and permitting the exercise of manual force on the cap to effect compression of the portion of the gasket overlying the bead between the latter and the opposed portion of the crown, there being a free space between the latter and the gasket.

EDWARD H. FABRICE.